United States Patent
Hussain et al.

(10) Patent No.: US 8,842,018 B2
(45) Date of Patent: Sep. 23, 2014

(54) SYSTEMS AND METHODS FOR TRACKING INSERTION AND REMOVAL CYCLES OF OPTICAL TRANSCEIVER MODULES

(75) Inventors: Asif Hussain, San Jose, CA (US); Joshua Chien, Fremont, CA (US); Sushil Dhiman, Union City, CA (US)

(73) Assignee: Sanmina-SCI Corporation, San Jose, CA (US)

( * ) Notice: Subject to any disclaimer, the term of this patent is extended or adjusted under 35 U.S.C. 154(b) by 795 days.

(21) Appl. No.: 12/906,102

(22) Filed: Oct. 17, 2010

(65) Prior Publication Data
US 2012/0051490 A1 Mar. 1, 2012

Related U.S. Application Data

(60) Provisional application No. 61/378,386, filed on Aug. 30, 2010.

(51) Int. Cl.
*G08B 21/00* (2006.01)
*G11C 16/34* (2006.01)
*G06K 19/00* (2006.01)
*G06F 21/86* (2013.01)

(52) U.S. Cl.
CPC .............. *G11C 16/349* (2013.01); *G06K 19/00* (2013.01); *G11C 16/3495* (2013.01); *G06F 21/86* (2013.01)
USPC ...... 340/654; 340/679; 340/686.2; 340/686.4

(58) Field of Classification Search
None
See application file for complete search history.

(56) References Cited

U.S. PATENT DOCUMENTS

| | | | | |
|---|---|---|---|---|
| 5,280,398 A * | 1/1994 | Wade et al. | | 360/60 |
| 5,552,776 A * | 9/1996 | Wade et al. | | 340/5.74 |
| 5,991,355 A * | 11/1999 | Dahlke | | 377/15 |
| 6,267,606 B1 * | 7/2001 | Poplawski et al. | | 439/92 |
| 7,321,313 B1 * | 1/2008 | Inlow | | 340/654 |
| 7,770,048 B2 * | 8/2010 | Aksamit et al. | | 713/502 |
| 8,549,019 B2 * | 10/2013 | Nandy et al. | | 707/754 |
| 8,560,292 B2 * | 10/2013 | Zunger et al. | | 703/13 |
| 2002/0118480 A1 * | 8/2002 | Rochat et al. | | 360/69 |
| 2005/0028078 A1 * | 2/2005 | Tann et al. | | 715/500.1 |
| 2008/0183966 A1 * | 7/2008 | Shim et al. | | 711/115 |
| 2011/0252684 A1 * | 10/2011 | Ufer et al. | | 42/1.03 |
| 2012/0157801 A1 * | 6/2012 | Hoss et al. | | 600/309 |

OTHER PUBLICATIONS

Ali Ghiasi, Robert Snively, Dal Allan. INF-8077i: 10 Gigabit Small Form Factor Pluggable Module. Revision 4.5. Aug. 31, 2005. SFF Committee. Saratoga, California.

* cited by examiner

*Primary Examiner* — Julie Lieu
(74) *Attorney, Agent, or Firm* — Loza & Loza, LLP; Julio M. Loza

(57) ABSTRACT

Methods and/or devices are provided for monitoring life-expectancy and/or useful life of an optical transceiver module by tracking an insertion cycle count of an optical transceiver module. An alarm/warning indicator may be generated or the optical transceiver module can be disabled completely if the insertion cycle count exceeds a predefined threshold. The host device first detects the insertion of the optical transceiver module and then reads the cycle count along with an identifier value from the non-volatile memory of the optical transceiver module. The host device then increments the insertion cycle count by one, to account for the current insertion, and stores this new cycle count into a non-volatile memory of the optical transceiver module. The insertion cycle count value may be encrypted and/or the non-volatile memory of the optical transceiver module may be password-protected to avoid accidental and/or unauthorized access to the non-volatile memory of the optical transceiver module.

24 Claims, 11 Drawing Sheets

| Measurement | Minimum | Maximum | Units | Comments |
|---|---|---|---|---|
| XFP transceiver insertion | 0 | 40 | Newtons | |
| XFP transceiver extraction | 0 | 30 | Newtons | |
| XFP transceiver retention | 90 | N/A | Newtons | No Damage to transceiver below 90N |
| Cage retention (Latch strength) | 180 | N/A | Newtons | No Damage to the latch below 180N |
| Cage retention in Host Board | 133 | N/A | Newtons | Force to be applied in a vertical direction with no damage to the cage |
| Insertion/removal cycles, connector/cage | 100 | N/A | Cycles | |
| Insertion/removal cycles, XFP Transceiver | 50 | N/A | Cycles | |

FIG. 7

| Byte Address | Description |
|---|---|
| 0 | Identifier (1 Byte) |
| 1 | Signal Conditioner Control |
| 2-57 | Threshold Values used for Alarm and Warning Flags (56 Bytes) |
| 58-59 | Optional VPS Control Registers (2 Bytes) |
| 60-69 | Reserved (10 Bytes) |
| 70-71 | BER Reporting |
| 72-75 | Wavelength Control Registers (4 Bytes) |
| 76-79 | FEC control Registers (4 Bytes) |
| 80-95 | Flags and Interrupt Control (16 Bytes) |
| 96-109 | A/D readout (14 Bytes) |
| 110-111 | General Control/Status bits (2 Bytes) |
| 112-117 | Reserved (6 Bytes) |
| 118 | Serial Interface Read/Write Error Checking (1 Byte) |
| 119-122 | Password Change Entry Area (Optional) (4 Bytes) |
| 123-126 | Password Entry Area (optional) (4 Bytes) |
| 127 | Page Select Byte |

FIG. 9

| Value | Description of Physical Device |
|---|---|
| 00h | Unknown or unspecified |
| 01h | GBIC |
| 02h | Module/connector soldered to motherboard |
| 03h | SFP |
| 04h | 300 pin XBI |
| 05h | XENPACK |
| 06h | XFP |
| 07h | XFF |
| 08h | XFP-E |
| 09h | XPAK |
| 0Ah | X2 |
| 0Ah-7Fh | Reserved |
| 80h-FFh | Vendor Specific |

FIG. 10

SYSTEMS AND METHODS FOR TRACKING INSERTION AND REMOVAL CYCLES OF OPTICAL TRANSCEIVER MODULES

CLAIM OF PRIORITY UNDER 35 U.S.C. §119

The present application for patent claims priority to U.S. Provisional Application No. 61/378,386 entitled "Systems and Methods for Tracking Insertion and Removal Cycles of Optical Transceiver Modules", filed Aug. 30, 2010, assigned to the assignee hereof and hereby expressly incorporated by reference herein.

FIELD

Various features relate to improvements to tracking insertion and removal cycles of optical transceiver modules over the lifetime of the modules.

BACKGROUND

Electronic systems are typically assembled through the use of electrical or optical connectors having a plug part and a socket part which interconnect. The electrical or optical connectors include, but are not limited to, circuit board to circuit board connectors, cable to circuit board connectors, and cable to cable connectors. In certain applications, the plug part of the connector is inserted and extracted from the socket part of the connector many times. For example, when testing a circuit board product, a manufacturer inserts and extracts many circuit boards from a single test interface connector. The connector's sockets, therefore, wear out and the electrical connection between any given circuit board and the test interface degrades over time and therefore affects the lifetime or useful life of the electronic system or assemblies. Further, lifetime or useful life of optical transceiver modules depends on many factors including transient conditions during power cycle, electronic components useful life such as capacitors, insertion/removal cycles and environmental conditions, gas, dust, contamination, voltage, current density, temperature, humidity, mechanical stress, vibration, shock, radiation, pressure, and intensity of magnetic and electrical fields, etc. The transient conditions during insertion/removal cycles are important factors affecting the lifetime of a removable electronic assembly (such as Optical Transceiver Modules).

Optical transceiver modules use electrical and optical connectors to convert signals between electrical signals and optical waveforms. Examples of types of optical transceivers modules include: Small Form-Factor Pluggable (SFP), small form-factor pluggable plus (SFP+), 10 Gigabit Small Form Factor Pluggable (XFP), 10 Gigabit Ethernet Transceiver Package (XENPAK), XFF converter, 10 Gigabit Ethernet Transceiver Package—shorter than XENPAK (XPAK), 10 Gigabit Small Form Factor Pluggable-Extended (XFP-E), Small form-factor 10 Gb/s pluggable fiber optic transceiver (X2), Quad Small Form-factor Pluggable Plus (QSFP+), etc. These modules have a limited number of insertion/removal cycles, i.e., the total number of times a module can be inserted (into one or more hosts) and guaranteed to work properly or satisfy a minimum level of operating characteristics. As defined in Multi Source Agreement (MSA) standards, a guaranteed threshold of a typical fifty (50) insertion/removal cycles requirement should be met by the vendors for optical transceiver modules. The vendors for optical transceiver modules, therefore, provide slightly better threshold than a typical fifty (50) insertion/removal cycles requirement. Depending on the usage, it is important to know when the insertion/removal cycles of the optical transceiver modules have exceeded this limit and is therefore an important factor to be considered in the maintenance and troubleshooting of a network system. Unfortunately, there is no feature or provision available in industry standard optical transceiver modules which provide a method of tracking/monitoring when the threshold number of insertion and removal cycles (e.g., fifty) has been exceeded and is therefore an unsolved engineering problem. Many original equipment manufacturers (OEM) include warnings or notices in their product specifications to the end user to minimize the number of insertion/removal cycles for the optical transceiver modules as such insertions/removals will reduce the lifetime of the optical transceiver modules.

Contract manufacturers, interoperability test labs, software quality assurance (SQA) labs, hardware quality assurance (HQA) labs, compliance test labs, etc. are a few examples of where these optical transceivers are used in a rotation and this insertion/removal issue remains an unsolved problem for them to figure out when those optical transceivers have exceeded their lifetime or useful life and can possibly be contributing in traffic related failures. As a result, this negatively affects the performance of their networking products and cause an increase cost of maintenance which could be trying to solve traffic related problems without knowing the actual root cause which can be the end of life Optical Transceiver modules. Further, this issue could cause a high rate of return for electronic assemblies which in fact only failed because of end of life optical transceiver modules.

Consequently, a method for tracking the number of insertion/removal cycles of an optical transceiver module and providing a notification when the number of insertion/removal cycles has exceeded a threshold cycle count is needed.

SUMMARY

The following presents a simplified summary of one or more implementations in order to provide a basic understanding of some implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

According to one feature, a system and method for monitoring/tracking the lifetime, useful life or life expectancy (e.g., manufacturer guaranteed insertion/removal cycles) of optical transceiver modules may be provided. The monitoring/tracking of the optical transceiver modules useful life and/or life expectancy may depend on many factors including transient conditions during power cycle, the useful life of electronic components, such as capacitors, insertion/removal cycles, environmental conditions, such as gas, dust, contamination, voltage, current density, temperature, humidity, mechanical stress, vibration, shock, radiation, pressure, and intensity of magnetic and electrical fields, etc. The useful life of electronic components (for example, capacitors) and wearing off of electrical connectors may be important factors affecting the useful life and/or life expectancy of an optical transceiver module.

In one aspect, a method operational on a host device for monitoring a useful life and/or life expectancy of a removable electronic assembly by tracking an insertion cycle count is provided. The host device may be, for example a circuit board having a processing circuit, a network switch or a router; while the removable electronic assembly may be a removable optical transceiver module. To track the insertion cycle count of the removable electronic assembly, the host device may first detect the insertion of the removable electronic assembly. Upon detection, the host device may read an identifier memory location of non-volatile memory in the removable electronic assembly to ascertain the removable electronic assembly identifier value as the identifier value is stored in the identifier memory location. The identifier value identifies the type or model of the removable electronic assembly which in turn allows the host device to ascertain the maximum insertion cycle count, as defined by Multi Source Agreement (MSA) standards, for the type of removable electronic assembly that has been inserted.

Next, the host device may read a cycle count memory location of the non-volatile memory in the removable electronic assembly to ascertain its current insertion cycle count as the current insertion cycle count may be stored in the cycle count memory location. Optionally, the insertion cycle count stored in the second location may be password protected. If the insertion cycle count is protected by a password, the host device may provide a password to the removable electronic assembly and if the password is valid, the host device may be allowed to ascertain or read the current insertion cycle count stored in cycle count memory location. To account for the current insertion of the removable electronic assembly, the insertion cycle count may be incremented by one and stored back in the cycle count memory location in the removable electronic assembly.

In yet another aspect, a status of the removable electronic assembly may be determined based on the insertion cycle count. For example, the status of the removable electronic assembly is a new status when the insertion cycle count read upon insertion of the removable electronic assembly is zero, while the status is a used status when the insertion cycle count read upon insertion of the removable electronic assembly is one or greater.

In yet another aspect, a method operational on a removable electronic assembly for tracking an insertion cycle count is provided. After the removable electronic assembly is inserted into a host device, the removable electronic assembly may provide its current insertion cycle count to the host device for incrementing to account for the current insertion. The incremented insertion cycle count is then received from the host device and stored in the cycle count memory location in non-volatile memory in the removable electronic assembly.

In yet another aspect, the host device may be required to provide a valid password to the removable electronic assembly prior to the removable electronic assembly providing the host device its current insertion cycle count.

In yet another aspect, the incremented insertion cycle count may be encrypted prior to storing in the cycle count memory location in the non-volatile memory.

In yet another aspect, the removable electronic assembly may provide an identifier value stored in an identifier memory location of the non-volatile memory, the identifier value identifying a type of the removable electronic assembly. Based on the type of removable electronic assembly and the minimum and maximum insertion cycle counts allowed for the type of the removable electronic assembly for compliance with Multi Source Agreement (MSA) standards, the removable electronic assembly may be disabled when the maximum insertion cycle count has been reached.

In yet another aspect, the removable electronic assembly, other than storing the insertion cycle count, is a passive device.

BRIEF DESCRIPTION OF THE DRAWINGS

FIG. 7 illustrates the requirement for insertion forces, extraction forces and retention forces of an optical transceiver module according to MSA standards.

FIG. 9 illustrates the general memory map of the lower 128 Byte address space of the 2-wire serial diagnostic map of FIG. 8.

FIG. 10 illustrates the general memory map of the upper 128 Byte address space of the 2-wire serial diagnostic map of FIG. 8.

DETAILED DESCRIPTION OF THE INVENTION

Figure 1:
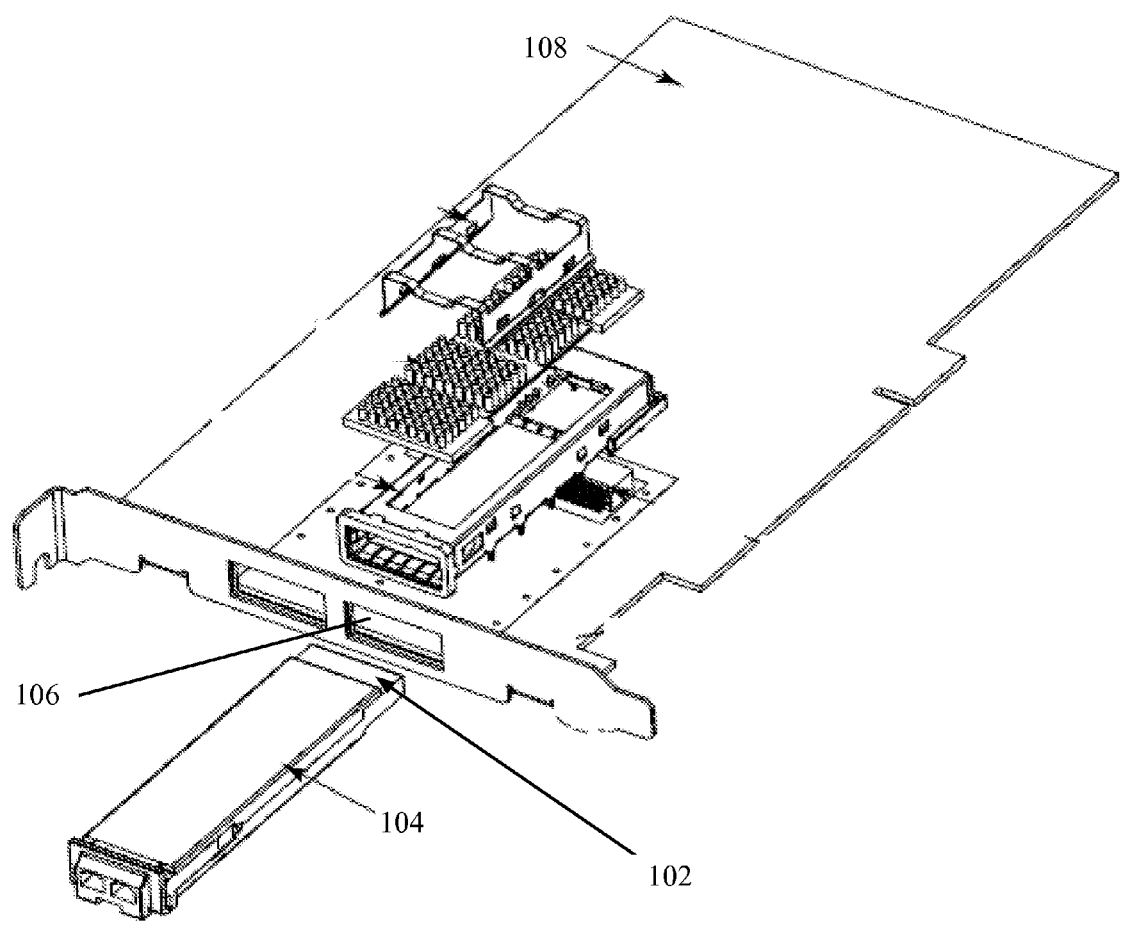
FIG. 1 illustrates a perspective view of a host device and a removable electronic assembly, according to one aspect.

In the following detailed description, numerous specific details are set forth in order to provide a thorough understanding of the embodiments. However, it will be understood by one of ordinary skill in the art that the embodiments may be practiced without these specific details. For example, operations may be shown in block diagrams, or not be shown at all, in order not to obscure the embodiments in unnecessary detail. In other instances, well-known operations, structures and techniques may not be shown in detail in order not to obscure the embodiments.

Overview

According to one aspect, a system and method for monitoring the lifetime, useful life and/or life expectancy (e.g., manufacturer guaranteed insertion/removal cycles) of electronic assemblies (e.g., optical transceiver modules) by tracking an insertion cycle count may be provided. The monitoring of the optical transceiver modules life expectancy may depend on many factors including transient conditions during power cycle, the useful life of electronic components, such as capacitors, insertion and removal cycles, environmental conditions, such as gas, dust, contamination, voltage, current density, temperature, humidity, mechanical stress, vibration, shock, radiation, pressure, and intensity of magnetic and electrical fields, etc. The useful life of electronic components and wearing off of electrical connectors may be important factors affecting the useful life and/or life expectancy of an optical transceiver module.

As a result of a limited useful life and/or life expectancy of the optical transceiver module, optical transceiver vendors may define a maximum number of insertion and removal cycles in their datasheet. For example, as per Multi Source Agreement (MSA) standard, the vendors of optical transceiver modules should meet a minimum of fifty (50) insertion and removal cycles. Consequently, the MSA has already studied and considered the wearing of electrical and/or optical connectors, the useful life of electronic components such as capacitors, etc., in their lifetime calculation of optical transceiver modules.

In one aspect, the number of insertion and removal cycles may be monitored or tracked by a host device, such as a motherboard, as the host device may be capable of detecting module insertion and removal by reading the status pin (MODULE DEF 0) of the optical transceiver module. The status pin may be grounded inside the optical transceiver module, i.e., a pin in the optical transceiver module is internally connected to ground. The whole system may be connected to a pull up resistor so if an optical transceiver module is not inserted (or disengaged), a digital high value ("1") may be read. Conversely, if an optical transceiver module is connected, the pin is internally connected to ground and a digital low value ("0") may be read. As a result, the host device may be able to determine if an optical transceiver module has been inserted or removed.

Additionally, the host device may not store insertion cycle counts in its memory, but instead write to non-volatile memory (e.g., Electrically Erasable Programmable Read-Only Memory (EEPROM)) of a daughter card (i.e. the optical transceiver module). This data may be encrypted and password protected to prevent the data from being manually altered (either intentionally or by accident). In this manner, even if the optical transceiver module is moved to a different host device, a record of the insertion and removal cycles may be maintained.

Exemplary Host Device and Optical Transceiver Module System

FIG. 1 illustrates a perspective view of a host device and a removable electronic assembly, such as an optical transceiver module, according to one aspect. The host device and removable electronic assembly may be a part, or subassembly, of a stackable or multiple slot chassis network switch system.

As shown, when testing, a plug portion 102 of a removable electronic assembly 104 may be inserted into a socket 106 of a host device 108. The removable electronic assembly 104 may be an optical transceiver module such as SFP, SFP+, XFP, XENPAK, XFF, XPAK, XFP-E, X2, QSFP+, etc. and the host device 108 may be a circuit board having a processing circuit. As described above, optical transceiver modules may have a limited number of insertion cycle counts in which the plug or electrical connector may be involved. That is, the manufacturer may guarantee the quality of the electrical connector for a specified number of insertion cycle counts.

According to one example, as defined in Multi Source Agreement (MSA) standards, optical transceiver modules may have a minimum of 50 insertion and removal cycles requirement. Depending on the usage of the optical transceiver module, it is important to know when an insertion and removal cycle count (hereinafter referred to as insertion cycle count for simplicity) of the optical transceiver modules have exceeded this limit and is therefore an important factor to be considered in the maintenance and troubleshooting of a network system.

One way the limited useful life and/or lifetime expectancy of optical transceiver modules has been addressed previously is by adding an insertion and removal cycles tracking counter in the host device, such as a network switch or a router, to track the insertion cycle count to keep track of the number of insertion cycle counts for each individual optical transceiver module. However, this solution merely determines, or calculates, the connector wear off and does not take into consideration various other factors, as described above, which determine the useful life and/or life expectancy of the optical transceiver module. Also, merely determining, or calculating, the connector wear off of the optical transceiver module has several disadvantages including, but not limited to, the optical transceiver module could still be used in another host device to which that specific optical transceiver module would be considered a new part even though it is used. Furthermore, there is no password protection and/or encryption algorithm utilized allowing for the insertion cycle count to be lost (either intentionally or unintentionally) or tampered with.

To prevent the optical transceiver module from being re-used as a new part, the method, according to one aspect of the present invention, implements an insertion and removal tracking counter in both the host device and the individual optical transceiver module. The host device may be used to determine the insertion cycle count and write/add the insertion cycle count to an Electrically Erasable Programmable Read-Only Memory (EEPROM) located in the optical transceiver module. In one aspect, the insertion cycle count may be encrypted prior to writing/adding it to the EEPROM.

Host Device—Exemplary Operation

Figure 2:
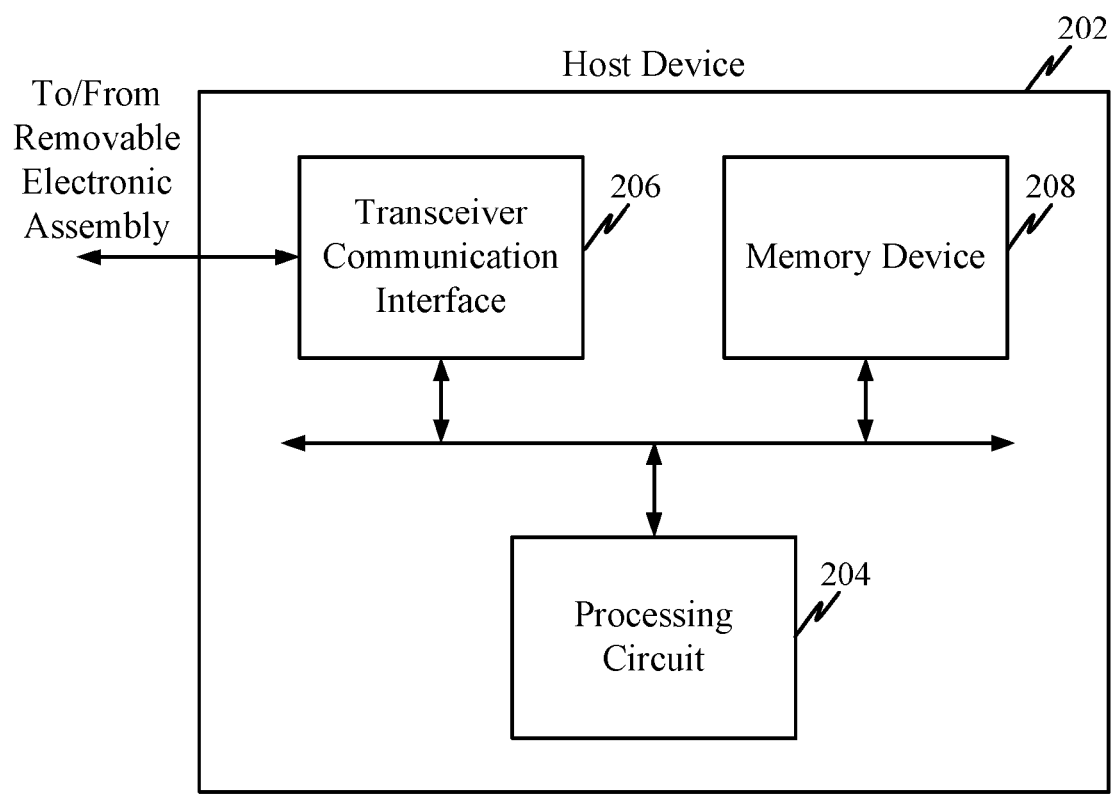
FIG. 2 is a block diagram illustrating an example of a host device, according to one aspect.

FIG. 2 is a block diagram illustrating an example of a host device. The host device 202 may include a processing circuit 204 (e.g., processor, processing module, etc.) coupled to a transceiver communication interface 206 (e.g. a socket for receiving a plug of a removable electronic assembly or removable optical transceiver module), and a memory device 208 for temporarily storing the insertion cycle count while it is being incremented. In one example, the processing circuit 204 may be adapted to (a) detect insertion of a removable electronic assembly, such an optical transceiver module, into the host device, (b) read an identifier value in an identifier memory location in the optical transceiver module to identify the model or type of optical transceiver module inserted, (c) (optional) enter a password allowing access to a cycle count memory location in the optical transceiver module, (d) read an insertion cycle count stored in the second memory in the removable electronic assembly, (e) increment the insertion cycle count by one to account for current insertion, (e) encrypt the incremented insertion cycle count (optional), (f) store the incremented insertion cycle count in the cycle count memory location in the optical transceiver module (removable electronic assembly), and (g) provide/trigger a warning when the insertion cycle count has exceeded a maximum insertion cycle count for the type of optical transceiver module inserted into the host device.

Figure 3:
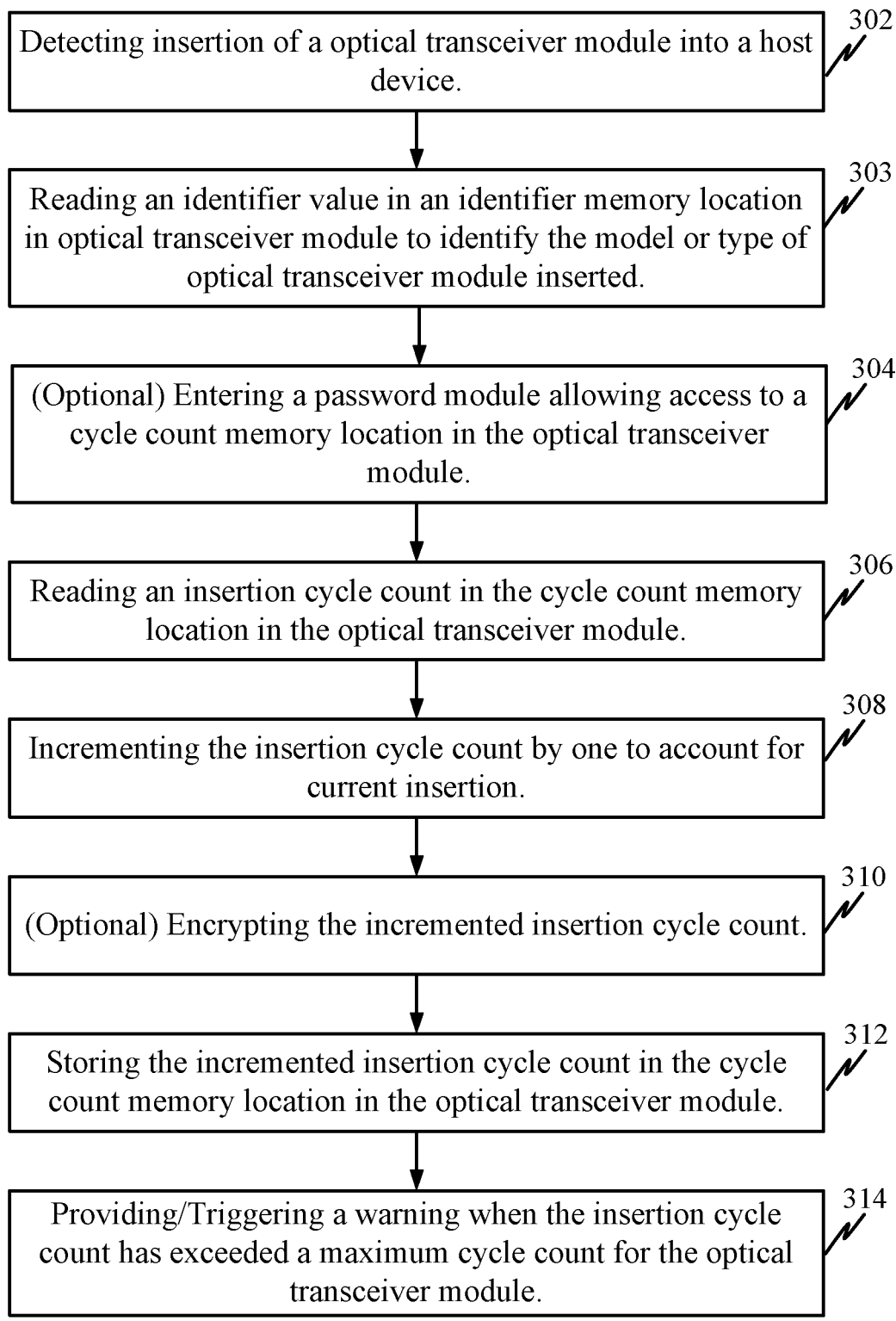
FIG. 3 is a flow diagram illustrating a method operational in a host device for monitoring the useful life and/or life expectancy of a removable electronic assembly by tracking an insertion cycle count of the removable electronic assembly, according to one aspect.

FIG. 3 is a flow diagram illustrating a method operational in a host device for monitoring the useful life and/or life expectancy of a removable electronic assembly by tracking an insertion cycle count of the removable electronic assembly. First, the host device may detect the insertion of a removable electronic assembly, such as an optical transceiver module 302. Upon detection of the optical transceiver module (e.g., a plug-in portion of the optical transceiver module has been inserted into a receiving connector of the host device), the host device may read an identifier value in an identifier memory location in the optical transceiver module to identify a model or type of the optical transceiver module that has been inserted 303. The identifier value, as described in further detail below, identifies the type or model of the optical transceiver module which in turn allows the host device to ascertain the maximum insertion cycle count, as defined by MSA standards, for the type of optical transceiver module that has been inserted.

Optionally, the host device may enter a password allowing access to a cycle count memory location in the optical transceiver module 304. In some embodiments, the host device may not need to enter a password to access the cycle count memory location. The insertion cycle count of the optical transceiver module may be stored in the cycle count memory location. The host device may read the value stored in the cycle count memory location in the optical transceiver module to ascertain its insertion cycle count 306. That is, the host device may read the insertion cycle count stored in the cycle count memory location of an EEPROM, or other non-volatile memory, in the optical transceiver module. The insertion cycle count may be used to determine if the optical transceiver module is new (i.e. being used for the first time) or is being re-used. For example, if the stored value is zero (0), the optical transceiver module may be new (i.e., it has not been previously inserted into a host system). Conversely, if the stored value is one (1) or higher, the optical transceiver module may be re-used (i.e., it has been previously inserted into a host system).

Next, the insertion cycle count may be incremented by one (1) to account for the current insertion of the optical transceiver module into the host device 308. Optionally, the incremented insertion cycle count may then be encrypted 310 and/or stored in the cycle count memory location in the optical transceiver module 312. If the insertion cycle count exceeds a maximum insertion cycle count for the type of optical transceiver module, the host device may provide or trigger a warning 314. For example, the host device may generate an alarm/warning message and/or disable the optical transceiver module so that it may be replaced. In accordance with one aspect, the maximum insertion cycle count for each type of optical transceiver module may be defined by the original equipment manufacturer (OEM) vendors.

Optical Transceiver Module—Exemplary Operation

Figure 4:
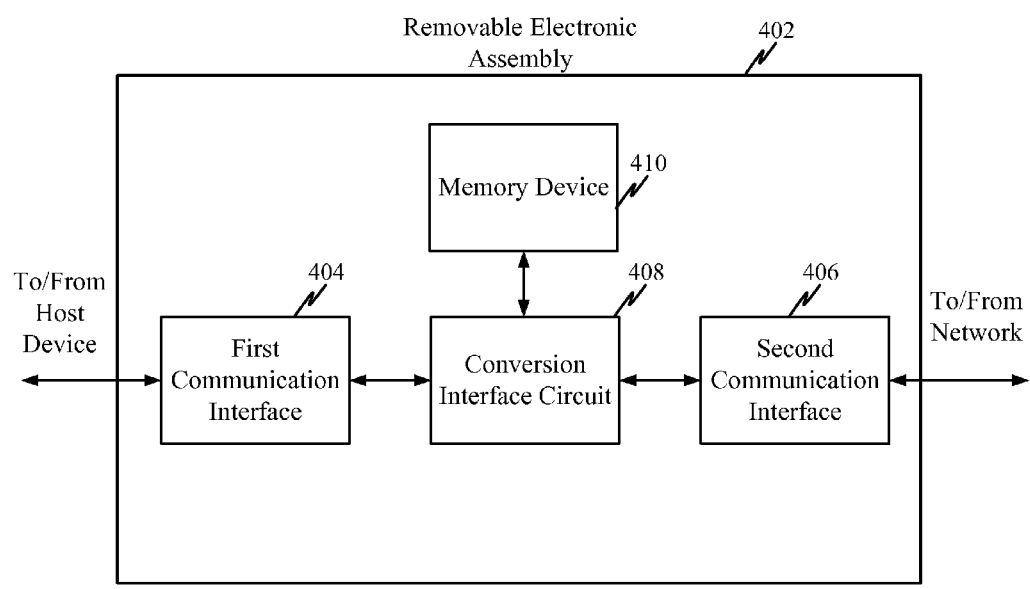
FIG. 4 is a block diagram illustrating an example of a removable electronic assembly, according to one aspect.

FIG. 4 is a block diagram illustrating an example of a removable electronic assembly, such as an optical transceiver module. The optical transceiver module 402 may include a first communication interface 404 (e.g. a plug for insertion into a socket of the host device), a second communication interface 406 (e.g. an optical interface) for accepting an optical input and a conversion interface circuit 408 located between the first and second communication interfaces 404, 406 for converting signals between the first and second communication interfaces 404, 406. The removable electronic assembly may also include a memory device 410 for temporarily storing an insertion cycle count. The memory device 410 may be non-volatile memory such as an EEPROM. Once the optical transceiver module is inserted into the host device, the memory device 410 of the optical transceiver module may be adapted to (a) provide an identifier value stored in an identifier memory location to the host device, the identifier value identifying the type or model of the optical transceiver module, (b) (optional) receive a password from the host device in an attempt to access a cycle count memory location, (c) (optional) if a password received, determine if the password is valid allowing the host device access to the cycle count memory location, (d) provide an insertion cycle count stored in a cycle count memory location to the host device, (e) receive an incremented insertion cycle count from the host device, where the insertion cycle count may optionally be encrypted, and/or (f) store the incremented insertion cycle count in the cycle count memory location. In accordance with one aspect, with the exception of storing the insertion cycle count in the cycle count memory location, the optical transceiver module is a passive device and does run any software.

Figure 5:
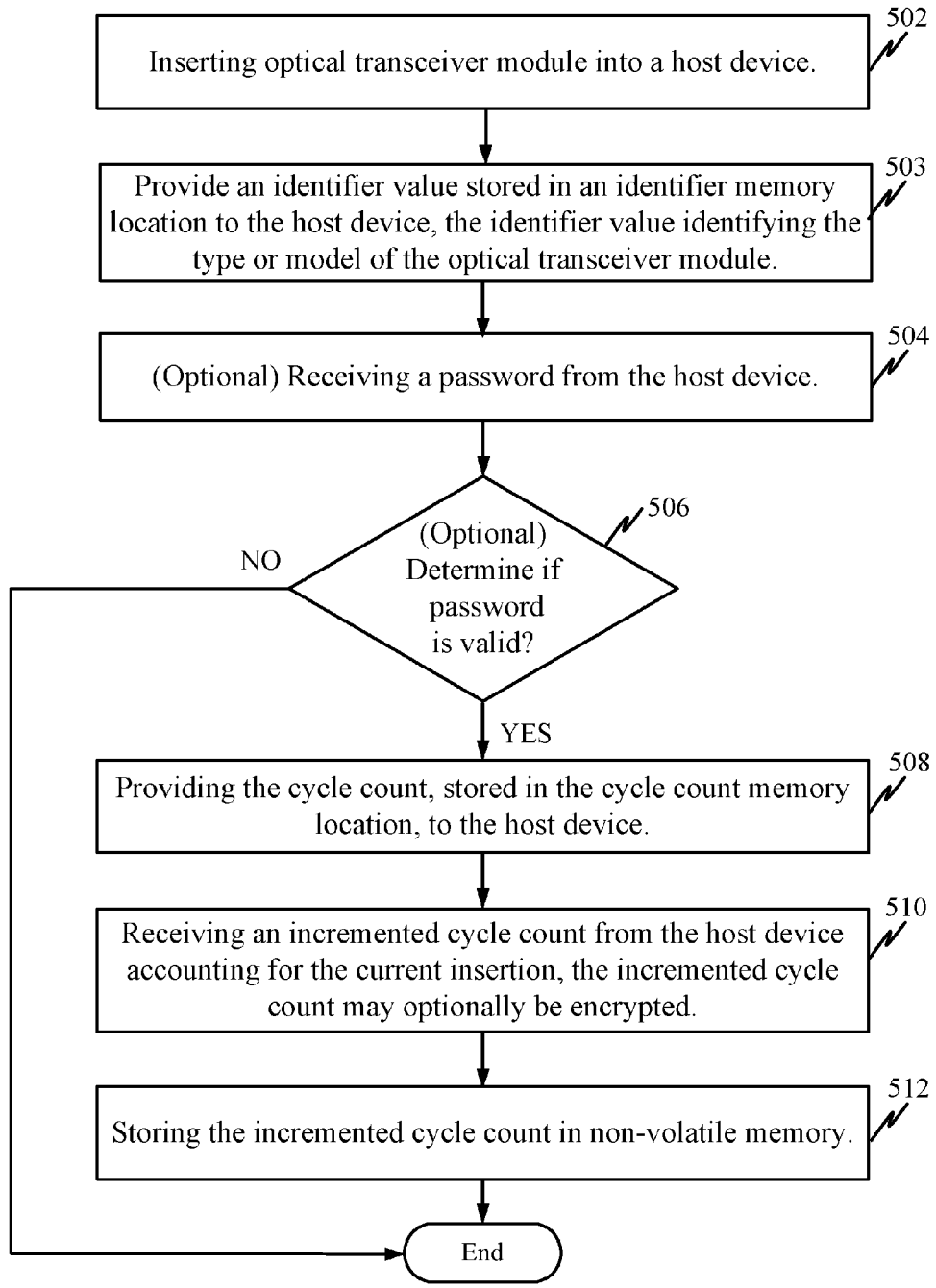
FIG. 5 is a flow diagram illustrating a method operational in a removable electronic assembly for tracking an insertion cycle count of the removable electronic assembly, according to one aspect.

FIG. 5 is a flow diagram illustrating a method operational in a removable electronic assembly for tracking an insertion cycle count of the removable electronic assembly (optical transceiver module). As described above, the insertion cycle count may be used to determine if the useful life and/or life expectancy of the optical transceiver module has been exceeded, as determined by the type of optical transceiver module and MSA standards. First, the optical transceiver module may be inserted into a host device 502. Next, an identifier value stored in an identifier memory location of the optical transceiver module may be provided the host device, the identifier value identifying the type or model of the optional transceiver module 503.

In some instances, it may be advantageous to securely store the insertion cycle count on the optical transceiver module to prevent tampering. Thus, the optical transceiver module may provide a security mechanism to read and/or write to a memory location that stores the insertion cycle count. For instance, optionally, the optical transceiver module may receive a password from the host device for accessing a cycle count memory location in the optical transceiver module 504. The optical transceiver module may then determine if the password is valid, described below in further detail 506. Upon the determination of a valid password, the insertion cycle count stored in the cycle count memory location in the optical transceiver module may be provided to the host device 508. Conversely, if the password is not valid, the host device may be determined to be unauthorized and access to the insertion cycle count is denied.

The optical transceiver module may receive an incremented insertion cycle count from the host device accounting for the current insertion of the optical transceiver module into the host device 510. Optionally, the incremented insertion cycle count may be encrypted by the host device prior to receipt by the optical transceiver module. The incremented (and optionally encrypted) insertion cycle count may then be stored in the cycle count memory location of the optical transceiver module 512.

Tracking Insertion/Removal Cycles—One Implementation

Figure 6A:
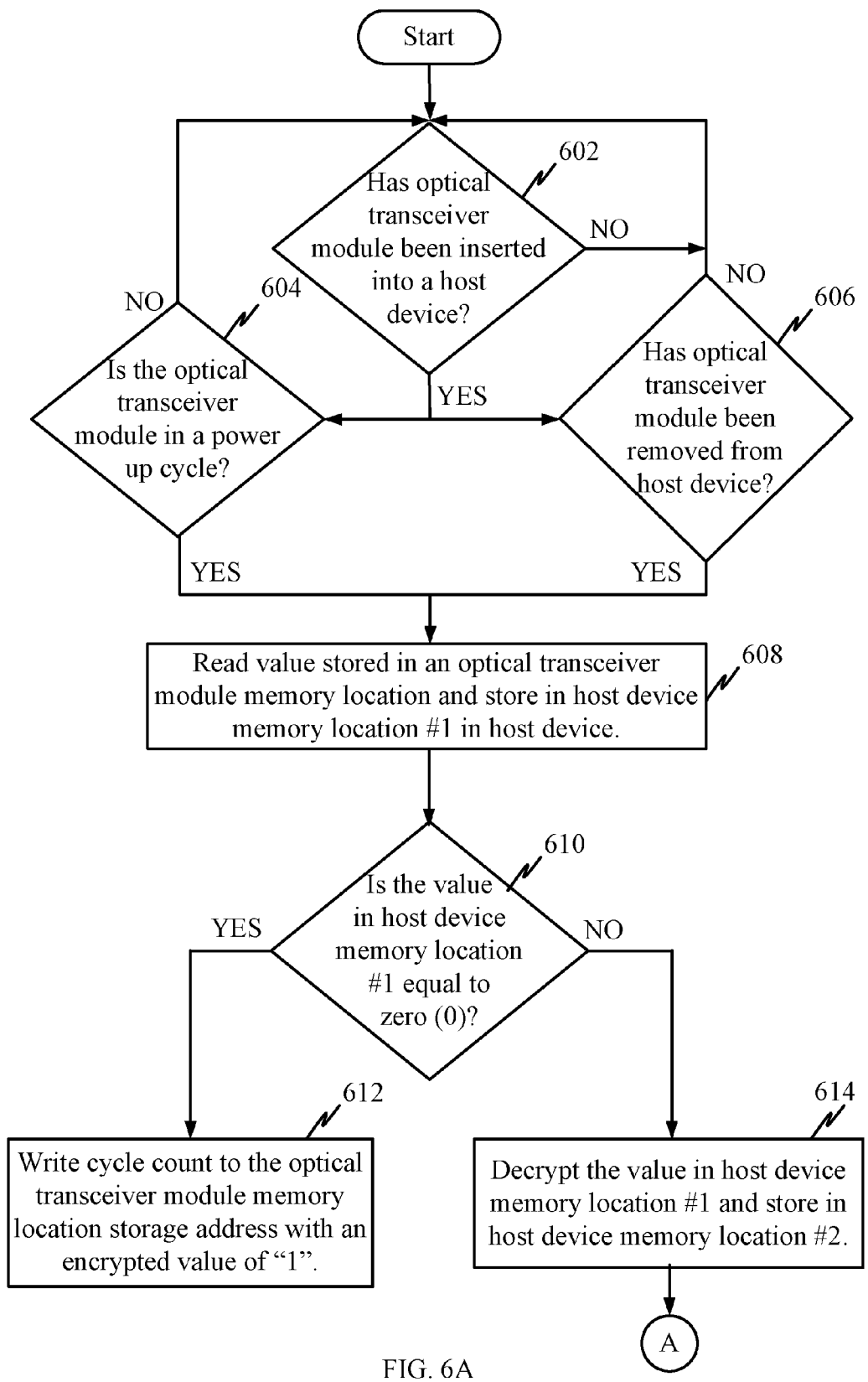
FIG. 6 illustrates a flow diagram of a method, operational on a host device, for tracking an insertion cycle count in an optical transceiver module, according to one aspect.
Figure 6B:
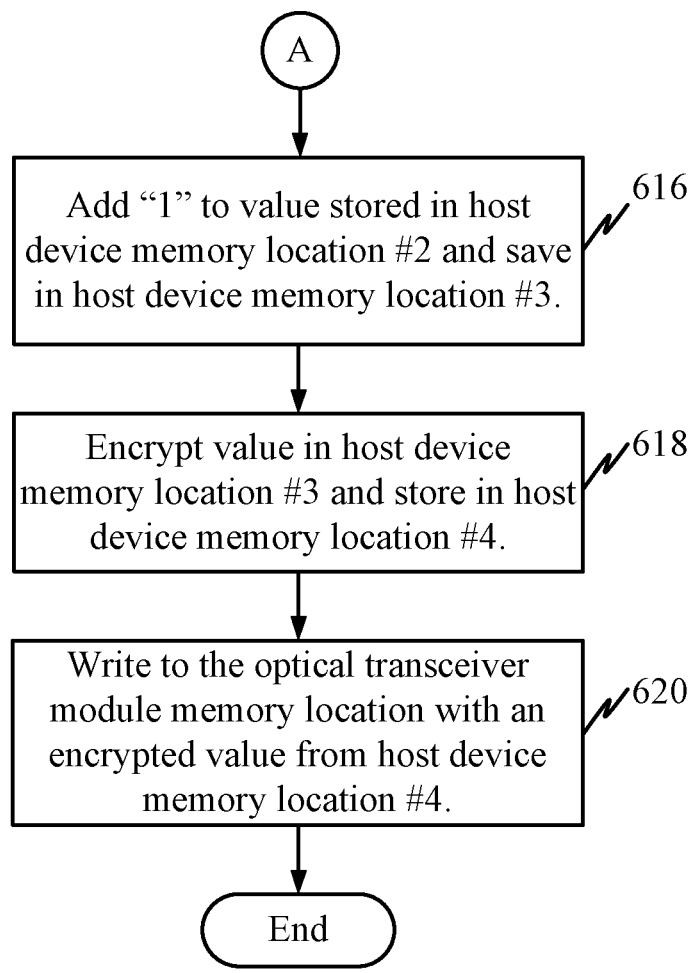

FIG. 6 illustrates a flow diagram of a method, operational on a host device, for tracking an insertion cycle count in an optical transceiver module, according to one aspect. The host device may include, but is not limited to, motherboard, a network switch or a router. First, it may be determined if an optical transceiver module has been inserted into the host device 602. If an optical transceiver module has not been inserted, the host device continues to monitor for the insertion of an optical transceiver module 602. However, if there is an indication that an optical transceiver module has been inserted, a determination may be made as to whether the optical transceiver module is in a power up cycle (i.e. has the optical transceiver module been fully powered up) 604 or if the optical transceiver module has been removed from the host device (i.e. has the removal of the module triggered an indication of an optical transceiver module being inserted) 606. If there is an indication that the optical transceiver module has been inserted and the inserted optical transceiver module is in a power up cycle or the optical transceiver module is actually being removed from the host device, the host device continues to monitor for the insertion of an optical transceiver module 602.

Upon detecting the insertion of an optical transceiver module which is not in a power up cycle or being removed from the host device, the value stored in an optical transceiver module memory location may be read and stored in a host device memory location #1 in the host device, where a "location" may be a register in the host device 608. Next, a determination may be made as to whether the value in the host device memory location #1 is equal to zero (0) 610. The value may be used to determine if the optical transceiver module is new (i.e. being used for the first time) or is being re-used. If a zero (0) has been detected, an encrypted "1" may be written to the optical transceiver module memory location 612. In other words, the optical transceiver module has never been used before so the insertion cycle count is set at 1.

Alternatively, if a zero (0) has not been detected and the optical transceiver module is not new, the value in the host device memory location #1 may be decrypted and stored in a host device memory location #2 of the host device 614. Next, a "1" may be added to the value (i.e. insertion cycle count) in the host device memory location #2 and saved in a host device memory location #3 of the host device 616. The adding of a "1" may indicate that the optical transceiver module is being inserted one more time. The value in the host device memory location #3 may then be encrypted and stored in a host device memory location #4 of the host device 618. Next, the optical transceiver module memory location may be written with the encrypted value from the host device location #4 620.

Stages for Tracking Insertion Cycle Counts in an Optical Transceiver Module

As discussed below, the method for tracking an insertion cycle count in an optical transceiver module may include the following stages:
 (1) Optical Transceiver Modules and their EEPROM register map.
 (2) Network Switch (Host Device) Software which will:
   a. Detect the optical transceiver modules insertion cycle count;
   b. Read certain EEPROM Memory Locations (registers);
   c. Process the data and then write to EEPROM Memory Locations (registers) the data.
 (3) Optional—Encryption/Decryption Algorithm to secure and prohibit the unauthorized modification of data.

(1) Optical Transceiver Modules

Insertion Cycle Count:

FIG. 7 illustrates the requirement for insertion forces, extraction forces and retention forces of an optical transceiver module according to MSA standards. Particularly, FIG. 7 illustrates examples of minimum and maximum insertion cycle counts for an optical transceiver module. That is, the minimum insertion cycle count in which the quality of the optical transceiver module is guaranteed by the vendor and the maximum insertion cycle count for which the quality of optical transceiver modules is guaranteed by the vendor. As shown, for example, there is a minimum insertion cycle count of 100 that is required for the connector/cage while a minimum insertion cycle count of 50 is required for XFP transceiver modules. In other words, optical transceiver modules received from vendors must meet a minimum insertion cycle count of 100 (i.e. must guarantee the quality of the optical transceiver module for at least 100 insertions) for connectors/cages and a minimum insertion cycle count of 50 (i.e. must guarantee the quality of the optical transceiver module for at least 50 insertions) for XFP transceiver modules to be compliant to MSA standards. Other MSA standards for SFP, SFP+, XENPAK, XFF, XPAK, XFP-E, X2, SFP+, etc. have similar limitations.

Memory Map Structure—Optical Transceiver Module

Figure 8:
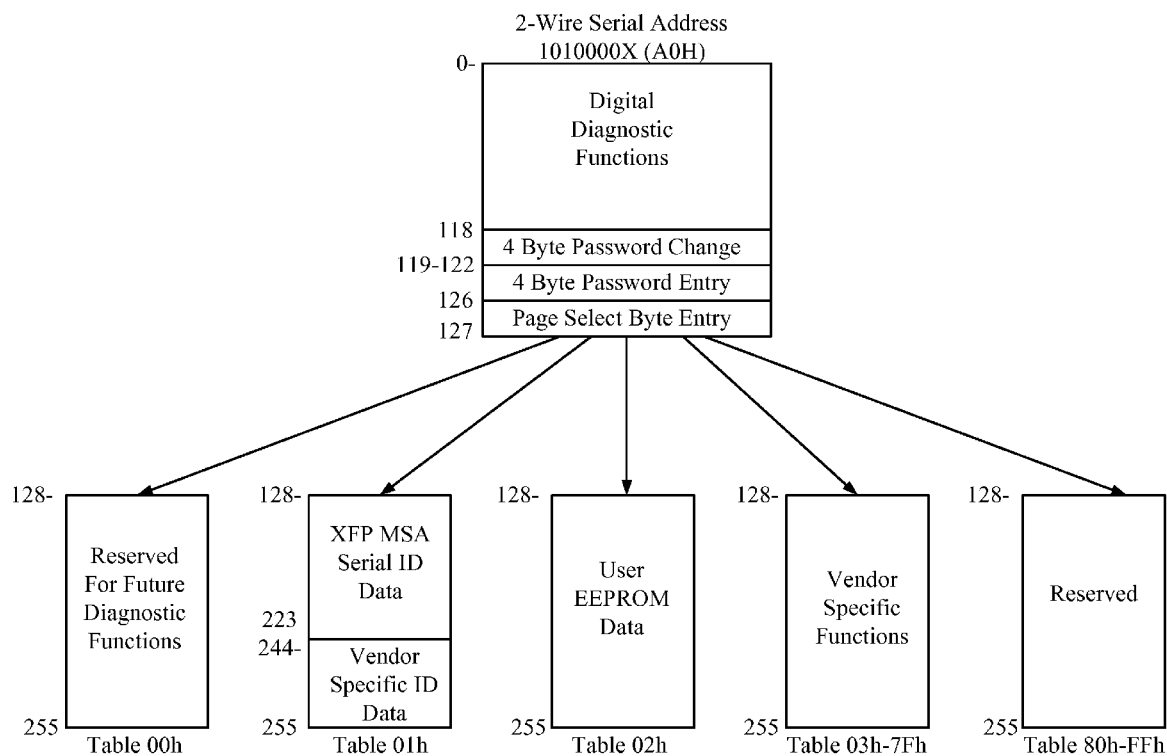
FIG. 8 illustrates a memory map structure of a memory device in an optical transceiver module, according to one aspect.

FIG. 8 illustrates a memory map structure of a memory device, such as an EEPROM, in an optical transceiver module according to one aspect. The memory map may be a 2-wire serial digital diagnostic map, according to MSA standards, comprising a 256 Byte 12C address space divided into lower and upper blocks of 128 Bytes. FIGS. 9 and 10 further describe examples of the lower and upper memory blocks of 128 Bytes.

Lower Memory Map

FIG. 9 illustrates the general memory map of the lower 128 Byte address space of the 2-wire serial diagnostic map of FIG. 8. Byte 0 of the lower memory map may contain a module identifier value which specifies the physical device described by the serial identification (ID) information allowing the host device to determine the minimum and maximum insertion cycle counts allowed for compliance with MSA standards. That is, the identifier allows the host device to determine what type of optical transceiver module has been inserted device the host device and consequently, the minimum and maximum insertion cycle counts allowed for compliance with MSA standards. The lower 128 Bytes of the 2-wire serial bus address space may be used to access a variety of measurements and diagnostic functions, to implement a set of control functions, and to select which of the various upper memory map tables are accessed on subsequent reads. This portion of the address space may always be directly addressable and thus is chosen for diagnostics and control functions that may need to be repeatedly accessed. According to one aspect, the identifier value may be used as the identifier memory location (or EEPROM Address A), as described above. There may be a unique identifier value for each type of optical transceiver module located at byte address 0 of the lower memory. As described below, passwords may optionally be required to be able to read or write to lower memory and may be part of the switch software function.

Upper Memory Map

FIG. 10 illustrates the general memory map of the upper 128 Byte address space of the 2-wire serial diagnostic map of FIG. 8. Multiple blocks of memories are available in the upper 128 Bytes of the address space and may be individually addressed through a table select Byte which the user enters into a location in the lower address space. Thus, there may be a total available address space of 128*256=32 Kbytes in this upper memory space. The upper address space tables may be used for less frequently accessed functions such as serial ID, user writable EEPROM, reserved EEPROM and diagnostics and control spaces for future standards definition, as well as ample space for vendor specific functions. These may be allocated as follows:

Table 00h: Reserved for future diagnostic and control functions
Table 01h: Serial ID EEPROM
Table 02h: User writable EEPROM
Table 03h-7Fh: Vendor specific functions
Table 80h-FFh: Reserved As described in Section 5.42 of XFP MSA standard Rev 4.5 Aug. 31, 2005, Table 02h is provided as user writable EEPROM. The host system may read or write to this memory for any purpose. If bit 3 of Table 01h Byte 129 is set, however, the first 10 bytes of Table 02h [128-137h] will be used to store the Common Language Equipment Identification Code (CLEI) code for this module. In other words, any available byte (except for first 10 bytes) from Table 02h can be used for 'Read/Write User Memory Space'. Part of this memory space may also be used by the OEM vendors for other purpose and therefore not all the bytes may be available. Also, the allocation of the byte to be used as the cycle count memory location (or EEPROM Address B), as described above, may change from vendor to vendor and one of the available bytes from this Table 02h (except for first 10 bytes) may be used as the cycle count memory location.

As this flexibility in allocation of the cycle count memory location (or EEPROM Address B) could be a problem in the case when the end user tries to use an optical transceiver module that has reached the end of its useful life and/or life expectancy in another host device or system. In order to prevent such re-use, password protection (as detailed in the MSA standard) may optionally be used to control write access to Table 02h where the cycle count memory location (or EEPROM Address B) is located. As a result the host device is not able to write to the cycle count memory location (or EEPROM Address B) and the optical transceiver module may be declared 'UNAUTHORIZED'.

The memory structure may optionally provide for a password entry location (to protect vendor internal functions or user writable memory and to control read or write access to the vendor tables 03h-7Fh) in the lower memory space. Passwords may not be needed to read any serial ID or diagnostics information in the lower memory address space or in Tables 00h-02h nor to write any controls defined in digital diagnostic functions. Additionally, passwords may be used by vendors to control write access to MSA defined read only data for factory setup or to OEMs to limit write access in the User EEPROM Table (02h).

(2) Host Device Software

As described above, the insertion and removal tracking counter may be implemented as follows: Upon detection of optical transceiver module insertion, the identifier memory location (or EEPROM Address A) may be read to determine the module identifier and as a result allowing the host device to determine the minimum and maximum insertion cycle counts allowed for compliance with MSA standards. Next, a password may optionally be entered by the host device allowing the host device to read the value (i.e. current insertion cycle count) located in the cycle count memory location (or EEPROM Address B), of the optical transceiver module, from byte address 0 of Table 01h. A decision may then be made, using the insertion cycle count, as to whether the optical transceiver module is new or has already been used. If the optical transceiver module is new, a value of 0x01 (optionally encrypted) may be written to the cycle count memory location of the optical transceiver module. On the other hand, if the optical transceiver module is used, the values read from the memory locations (EEPROM address A and EEPROM address B) may be decrypted. The first decrypted value may indicate the type of the optical transceiver module while the second decrypted value may indicate the current insertion cycle count. 0x01 may be added to the current insertion cycle count to account for the current insertion of the optical transceiver module into the host device. Encryption with the added value may then optionally be performed for the new insertion cycle count. The new insertion cycle count may then be written to the cycle count memory location (or EEPROM Address B), in upper memory, from byte address 0 of Table 01h.

As described above, in accordance with one aspect, with the exception of storing the insertion cycle count in the cycle count memory location, the optical transceiver module is a passive device and does run any software.

(3) Optional—Encryption/Decryption Algorithm

The insertion cycle count, described above, may be encrypted prior to storing in the cycle count memory location of the non-volatile memory, such as an EEPROM, of the optical transceiver module. Encrypting the insertion cycle count may prevent the insertion cycle count from being modified either intentionally or accidentally. According to one aspect, a modified exclusive OR (XOR) encryption algorithm concept may be used to encrypt the inserted cycle count. As a XOR's inverse is itself, the XOR encryption algorithm may be used to both encrypt and decrypt data. To strengthen the algorithm, the algorithm may be modified by creating random permutations of the key that specifies the particular transformation of plaintext into ciphertext, or vice versa during decryption. In some examples random permutations of the key may be done by bit rotations (i.e. a bitwise operation) on the cipher value (or encrypted value).

Encryption of Insertion Cycle Count

In one example, the insertion cycle count may be encrypted to obtain a cipher value or the encrypted value (i.e. encrypted version of the insertion cycle count for an optical transceiver module). In this example, the XOR function may be applied to the insertion cycle count to generate a cipher value. For instance, the cipher value (CV) may be generated according to:

$$\text{cipher value}(CV) = XOR((XOR(m,n),k)$$

where:
k is a security key value (i.e., password) represented by a byte length (eight bits);
m is a byte value representation of the read value from the cycle count memory location (or EEPROM Address B), e.g. representative of an insertion cycle count; and
n is a byte value representation of the read value from the identifier memory location (or EEPROM Address A), e.g. representative of a module identifier value.

In this example, value m (e.g., representing the insertion cycle count stored in the optical transceiver module) is first XORed with value n (e.g., representing the optical transceiver module type or identifier). Then, the resulting value from this first XOR operation may again be XORed a second time with the key value k (e.g., representing a password used for encrypting/decrypting the insertion cycle count) to obtain the cipher value (CV).

To strengthen this algorithm even further, the cipher value CV may be secured by random permutations, such as rotating bits (i.e. a bitwise operation). In one example, a bitwise XOR takes two bit patterns of equal length and performs a logical XOR operation on each pair of corresponding bits. The result in each position is "1" if the two bits are different, and "0" if they are the same. Rotating bits, also known as a cyclic shift, may be accomplished as follows:

$$\text{Rotated Value}(RV) = rot(CV, d, b)$$

where,
CV is the cipher value calculated above (i.e. cipher value (CV)=XOR ((XOR(m,n),k));
d is the direction of rotation (e.g., Right or Left rotation);
b defines how many times to rotate.

According to one aspect, left bit rotation (d=Left) for 3 times (b=3) may be used to generated the rotated value RV. In this manner, the insertion cycle count m may be encrypted for storage.

Decryption

Once an optical transceiver module already stores an encrypted value representing the insertion cycle count (e.g., either the cipher value CV or rotated value RV), this value may be decrypted before a new insertion cycle is added to it (i.e. incrementing the insertion cycle count). That is, the optical transceiver module may store its insertion cycle count in encrypted form and the insertion cycle count needs to be decrypted prior to incrementing it to account for the new insertion cycle. To obtain the decrypted value (i.e. the decrypted insertion cycle count), the encrypted value (i.e. insertion cycle count) read from the cycle count memory location (or EEPROM Address B) in the optical transceiver module is decrypted before adding 0x01 for a new insertion/removal cycle. For example, to decrypt the encrypted value, the encryption operations are reversed. For instance, the encrypted value may be first rotate right 3 times (since encryption was rotated left 3 times) and then XNORed (i.e., inverse operation of exclusive OR) as follows:

$$\text{Rotated Value } (RV') = rot(m, d, b)$$
$$= rot(0 \times cd, \text{RIGHT}, 3)$$

XNOR may then be applied as follows:

$$CV' = XNOR(XNOR((RV', n), k)$$

Since the module identifier value n and password k are known by the host system, the dual XNOR operations result in the value CV' which is equal to the decrypted insertion cycle count m.

Case A: Exemplary Example when Optical Transceiver Module is new:
 m=0x00=b'00000000
 n=0x12=b'00010010
 k=0xaa=b'10101010

First 0x01 may be added to the value (i.e. insertion cycle count) of m for first insertion cycle—no decryption of m is required since the optical transceiver module is new.

Calculating the encrypted value is as follows:

$$m = 0 \times 01$$

$$\text{cipher value } (CV) = XOR((XOR(m, n), k)$$
$$= XOR((XOR(0 \times 01, 0 \times 12), 0 \times aa)$$
$$= XOR(0 \times 13, 0 \times aa)$$
$$= 0 \times b9 (\text{or } b'10111001)$$

Rotation, as described above, is as follows:

$$\text{Rotated Value } (RV) = rot(CV, d, b)$$
$$= rot(0 \times b9, \text{LEFT}, 3)$$
$$= 0 \times cd (\text{or } = b'11001101)$$

Based on this, the host device may write a hex value of 0xcd to the cycle count memory location (or EEPROM Address B) of the optical transceiver module. In other words, the encrypted value (i.e. the encrypted insertion cycle count) is written to the cycle count memory location of the optical transceiver module. By encrypting this value, the value (i.e. the insertion cycle count) may be protected to prevent the data from being manually altered (either intentionally or by accident).

Case B: Exemplary Example when Optical Transceiver Module is not new:

To determine the current insertion cycle count, the value stored in the cycle count memory location of the optical transceiver module is read. This may be accomplished by reading 0xcd (i.e. the encrypted insertion cycle count stored in the cycle count memory location) which was written in Case A above as follows:
 m=0xcd=b'11001101
 n=0x12=b'00010010
 k=0xaa=b'10101010

First, the value of m (i.e. insertion cycle count) may be decrypted before 0x01 for a new insertion cycle count can be added. That is, the encrypted cycle count may be decrypted prior to incrementing the insertion cycle count by 1 to account for the current insertion. As discussed above, to decrypt the encrypted value—first rotate right 3 times (as encryption was rotated left 3 times) and then XNOR as follows:

$$\text{Rotated Value } (RV') = rot(m, d, b)$$
$$= rot(0 \times cd, \text{RIGHT}, 3)$$
$$= 0 \times b9 (\text{or} = b'10111001)$$

$$CV' = XNOR(XNOR((RV', n), k)$$

$$m' = XNOR(0 \times ab, k)$$
$$= 0 \times 01$$

This means that the optical transceiver module has already been inserted/removed for 1 time. As a result, 0x01 may be added to the value of m' and a new cipher value may be calculated as follows:

$$m = 0 \times 02 (\text{after adding } 0 \times 01)$$

$$\text{cipher value } (CV) = XOR((XOR(m, n), k)$$
$$= XOR((XOR(0 \times 02, 0 \times 12), 0 \times aa)$$
$$= XOR(0 \times 10, 0 \times aa)$$
$$= 0 \times ba (\text{or } b'10111010)$$

Rotation is as follows:

$$\text{Rotated Value } (RV) = rot(CV, d, b)$$
$$= rot(0 \times ba, \text{LEFT}, 3)$$
$$= 0 \times d5 (\text{or} = b'11010101)$$

Based on this the host device may write a hex value of 0xd5 to the cycle count memory location (or EEPROM Address B) of the optical transceiver module. In other words, the encrypted value (i.e. the encrypted insertion cycle count) is written to the cycle count memory location of the optical transceiver module. By encrypting this value, the value (i.e. the insertion cycle count) may be protected to prevent the data from being manually altered (either intentionally or by accident).

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

The invention claimed is:

1. A method, operational on a host device, for monitoring a life expectancy or useful life of a removable electronic assembly by tracking an insertion cycle count, comprising:
   detecting insertion of the removable electronic assembly into the host device;
   reading a cycle count memory location in the removable electronic assembly to ascertain the insertion cycle count;
   incrementing the insertion cycle count by one to account for current insertion; and
   storing the incremented insertion cycle count in the cycle count memory location in a non-mechanical memory device in the removable electronic assembly.

2. The method of claim 1, further comprising:
   entering a password upon the detection of the removable electronic assembly allowing access to the cycle count memory location.

3. The method of claim 1, further comprising determining a status of the removable electronic assembly based on the insertion cycle count read upon insertion of the removable electronic assembly into the host device.

4. The method of claim 3, wherein the status of the removable electronic assembly is a new status when the insertion cycle count read upon insertion of the removable electronic assembly is zero.

5. The method of claim 3, wherein the status of the removable electronic assembly is a used status when the insertion cycle count read upon insertion of the removable electronic assembly is one or greater.

6. The method of claim 1, wherein the cycle count memory location is in a semiconductor non-volatile memory device in the removable electronic assembly.

7. The method of claim 1, wherein the host device includes at least one of a network switch, a router and a networking interface.

8. The method of claim 1, further comprising:
   encrypting the insertion cycle count prior to writing to the cycle count memory location.

9. The method of claim 1, further comprising reading an identifier value in an identifier memory location in the removable electronic assembly, the identifier value identifying a type of the removable electronic assembly.

10. The method of claim 9, further comprising:
    providing a warning or disable use of the removable electronic assembly when the insertion cycle count has exceeded a maximum insertion cycle count for the type of the removable electronic assembly identified by the identifier value.

11. The method of claim 1, wherein the removable electronic assembly is an optical transceiver module.

12. The method of claim 1, wherein the removable electronic assembly, other than storing the insertion cycle count, is a passive device.

13. A host device, for monitoring a life expectancy or useful life of a removable electronic assembly by tracking an insertion cycle count, comprising:
    a first communication interface for receiving the removable electronic assembly;
    a processing circuit in communication with the first communication interface, the processing circuit adapted to:
       detect insertion of the removable electronic assembly into the host device;
       read a cycle count memory location in the removable electronic assembly to ascertain the insertion cycle count;
       increment the insertion cycle count by one to account for current insertion; and
       store the incremented insertion cycle count in the cycle count memory location in a non-mechanical memory device in the removable electronic assembly.

14. The host device of claim 13, wherein a status of the removable electronic assembly is a used status when the insertion cycle count read upon insertion of the removable electronic assembly is one or greater.

15. The host device of claim 13, wherein the processing circuit is further adapted to read an identifier value in an identifier memory location in the removable electronic assembly, the identifier value identifying a type of the removable electronic assembly.

16. The host device of claim 15, wherein the processing circuit is further adapted to provide a warning or disable use of the removable electronic assembly when the insertion cycle count has exceeded a maximum insertion cycle count for the type of the removable electronic assembly identified by the identifier value.

17. A host device, for monitoring a life expectancy or useful life of a removable electronic assembly by tracking an insertion cycle count, comprising:
    means for detecting insertion of the removable electronic assembly into the host device;
    means for reading a cycle count memory location in the removable electronic assembly to ascertain the insertion cycle count;
    means for incrementing the insertion cycle count by one to account for current insertion; and
    means for storing the incremented insertion cycle count in the cycle count memory location in a non-mechanical memory device in the removable electronic assembly.

18. A method, operational on a removable electronic assembly, for tracking an insertion cycle count, comprising:
    inserting the removable electronic assembly into a host device;
    providing the insertion cycle count to the host device;
    receiving an incremented insertion cycle count from the host device, the incremented insertion cycle count accounting for current insertion of the removable electronic assembly into the host device; and
    storing the incremented insertion cycle count in a cycle count memory location in non-volatile memory of a non-mechanical memory device in the removable electronic assembly.

19. The method of claim 18, further comprising:
    receiving a password from the host device; and
    determining if the password received from the host device is valid prior to allowing the host device access to the cycle count memory location and the insertion cycle count.

20. The method of claim 18, further comprising:
providing a warning or disabling use of the removable electronic assembly when the maximum insertion cycle count has been reached.

21. A removable electronic assembly, comprising:
a communication interface corresponding to an interface on a host device;
a memory device, in communication with the communication interface, that stores an insertion cycle count, the memory device configured to:
provide the insertion cycle count to the host device;
receive an incremented insertion cycle count from the host device, the incremented insertion cycle count accounting for current insertion of the electronic assembly into the host device; and
store the incremented insertion cycle count in a cycle count memory location in non-volatile memory of a non-mechanical memory device in the removable electronic assembly.

22. A removable electronic assembly, comprising:
means for inserting the removable electronic assembly into a host device;
means for providing the insertion cycle count to the host device;
means for receiving an incremented insertion cycle count from the host device, the incremented insertion cycle count accounting for current insertion of the removable electronic assembly into the host device; and
means for storing the incremented insertion cycle count in a cycle count memory location in non-volatile memory of a non-mechanical memory device in the removable electronic assembly.

23. The removable electronic assembly of claim 21, wherein the memory device is further configured to:
provide a warning or disable use of the removable electronic assembly when the insertion cycle count has exceeded a maximum insertion cycle count.

24. The removable electronic assembly of claim 22, further comprising:
means for providing a warning or disable use of the removable electronic assembly when the insertion cycle count has exceeded a maximum insertion cycle count.

* * * * *